United States Patent
Braam et al.

(10) Patent No.: US 10,623,485 B2
(45) Date of Patent: Apr. 14, 2020

(54) METHOD OF, AND APPARATUS FOR, FILE SYSTEM REPLICATION

(75) Inventors: Peter Braam, Nederland, CO (US);
Nikita Danilov, Moscow (RU);
Nathaniel Rutman, Portland, OR (US);
Yuriy Umanets, Kiev (UA)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/550,021

(22) Filed: Jul. 16, 2012

(65) Prior Publication Data

US 2014/0019413 A1 Jan. 16, 2014

(51) Int. Cl.
| | | |
|---|---|---|
| *H04L 29/08* | (2006.01) | |
| *G06F 11/20* | (2006.01) | |
| *G06F 11/14* | (2006.01) | |
| *G06F 16/182* | (2019.01) | |
| *G06F 11/10* | (2006.01) | |

(52) U.S. Cl.
CPC ...... *H04L 67/1095* (2013.01); *G06F 11/1471* (2013.01); *G06F 11/2094* (2013.01); *G06F 16/1844* (2019.01); *G06F 11/1076* (2013.01)

(58) Field of Classification Search
CPC .... G06F 19/322; G06F 21/57; G06F 11/1471; G06F 11/1451; G06F 11/0751; G06F 16/289; G06Q 50/22; H04L 67/1095
USPC ....................................................... 707/625
See application file for complete search history.

(56) References Cited

U.S. PATENT DOCUMENTS

| | | | |
|---|---|---|---|
| 5,832,508 A * | 11/1998 | Sherman et al. | |
| 6,088,717 A * | 7/2000 | Reed et al. | 709/201 |
| 7,774,315 B1* | 8/2010 | Galker | 707/644 |
| 8,055,613 B1* | 11/2011 | Mu et al. | 707/610 |
| 8,296,271 B1* | 10/2012 | Richardson et al. | 707/674 |
| 8,417,746 B1* | 4/2013 | Gillett, Jr. | G06F 16/14 707/829 |
| 2004/0015468 A1* | 1/2004 | Beier et al. | 707/1 |
| 2007/0179934 A1* | 8/2007 | Basov | G06F 17/30336 |
| 2009/0030983 A1* | 1/2009 | Malaiyandi | G06F 11/1076 709/204 |
| 2009/0300077 A1* | 12/2009 | Shi | G06Q 10/10 |
| 2012/0101990 A1* | 4/2012 | Holenstein | G06F 16/2365 707/615 |
| 2012/0158670 A1* | 6/2012 | Sharma et al. | 707/692 |

* cited by examiner

*Primary Examiner* — Mariela Reyes
*Assistant Examiner* — Courtney Harmon
(74) *Attorney, Agent, or Firm* — Mueting, Raasch & Gebhardt, P.A.

(57) ABSTRACT

A method of replicating a source file system on a storage system, the method including: utilising a changelog operable to store sequentially a data record corresponding to a modification of a source file system by a storage request; specifying a first data record of the changelog at a first time; initiating a scan of the directory inodes of the source file system at the first time; scanning the directory inodes; completing the scan at a second time later than the first time; specifying a second data record of the changelog at the second time; storing, in a database, information corresponding to the scanned directory inodes; updating the database with sequential data records from the first data record to the second data record of the changelog; and building, on a computer system, a replica target file system based on the database.

20 Claims, 5 Drawing Sheets

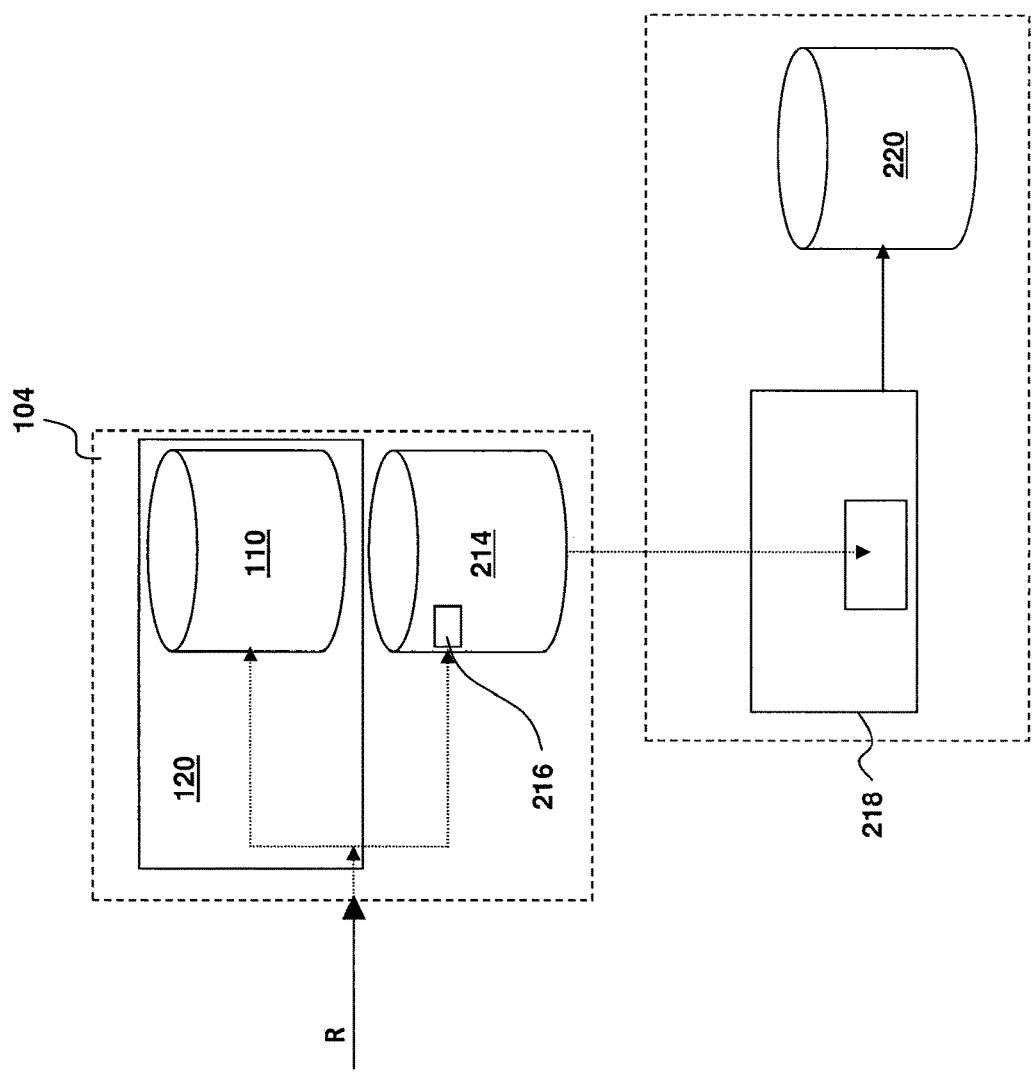

METHOD OF, AND APPARATUS FOR, FILE SYSTEM REPLICATION

The present invention relates to a method of, and apparatus for, replicating data on a file system. More particularly, the present invention relates to a method of, and apparatus for, accurately replicating data on a file system that is in use.

A typical file system consists of a hierarchy of directories (catalogues, folders) organised into a tree structure and holding data files as leaves of the tree. File data together with additional data describing file system structure are located in a storage system. A storage system may comprise, for example, either a plurality of hard disk drives connected together over a network to one or more servers, each of which provides a network-addressable storage resource or a local configuration where the storage resource is connected directly to a terminal or server or may form a local storage arrangement such as a hard disk drive in a laptop or personal computer.

A file system is run on the OS. The file system is operable to track and manage where data is stored on the storage system and where free or available storage space exists on the storage system. Clustered file systems can store many millions of files which are often distributed across a multiplicity of storage devices, such as hard disk drives. Non-exhaustive examples of typical file systems with which the invention may be used include: NTFS, HFS, ext3 and ext4.

In order to preserve a record of the data stored on a storage system, it is desirable to back up the contents and file structure of a file system. This is usually done to a separate server or storage system. However, a replica of the contents and file structure of a file system may be created on a separate logical drive or partition forming part of the same storage system. The source file system is used to form a replica target file system for backup and potential restoration purposes to ensure data integrity. The replica file system is also operable to improve performance, availability and fault tolerance by using replica concurrently with the master file system.

Most file systems are large and in constant use. Such systems are difficult to back up accurately because the replica cannot be synchronised in a coherent manner. A known approach is to traverse the entire file system hierarchy, and synchronise each file as it is encountered.

However, this approach only provides a replica consistent with the source if the file system is quiescent during the replication process, i.e. there is little or no activity on the file system. In most practical systems, this condition is unlikely to occur, particularly given the time (of the order of several hours) required to backup a large file system.

Therefore, this approach is unlikely to result in a suitably accurate replica of the file system and contents. Without a coherent replica or backup, the data in the replica may be unusable. In addition, such a system-wide scan is a highly inefficient use of resources.

One approach to address this issue is to utilise a "changelog". A changelog is a set of records describing the on-going changes in the file system, and perform the same changes on the replica. Using a changelog can, under certain circumstances, enable the production of a coherent replica or backup.

However, if a changelog has not been recorded since the start of use of the file system, then a coherent replica cannot be produced by using changelog alone. This situation may occur when, for example, the file system has been in use for some time prior to creation of the changelog. In this case, the changelog is incomplete because it does not capture the information relating to the data created before the changelog was enabled.

This can be addressed by making an inventory of a file system when turning on the changelog, and then merging the inventory with the changelog. However, the difficulty with this approach is that while the inventory is being created (necessarily by means of a scan), the changelog will also see changes and so the replica will not be coherent with the source.

Therefore, known approaches to file system replication suffer from the technical problem that they are unsuitable for use modern storage systems due to their inability to produce a coherent replica of a source without excessive downtime of a storage system. Therefore, there exists a need to provide a method and system which is able to provide a system and method which is operable to produce a coherent replica of a source file system and contents whilst the file system is in use.

According to a first aspect of the present invention, there is provided a method of replicating a source file system on a storage system comprising at least one data storage resource, the or each data storage resource comprising a source file system operable to process storage requests to said data storage resource from one or more client computers, the source file system comprising a plurality of files and directories, each file being associated with a file inode and each directory being associated with a directory inode, the method comprising: a) utilising, on a computer system, a changelog operable to store sequentially one or more data records each corresponding to a modification of the source file system by a storage request; b) specifying a first data record of said changelog at a first time; c) initiating, on a computer system, a scan of the directory inodes of said source file system at said first time; d) scanning, on a computer system said directory inodes; e) completing, on a computer system, said scan at a second time later than said first time; f) specifying a second data record of said changelog at said second time; g) storing, in a database, information corresponding to said scanned directory inodes; h) updating, on a computer system, said database with sequential data records from said first data record to said second data record of said changelog; and i) building, on a computer system, a replica target file system based on said database.

By providing such an arrangement, an in-use file system can be replicated efficiently and accurately. In contrast, known arrangements are unable to build a coherent replica of a file system which is in use and being modified whilst the replica is being built.

In one embodiment, step i) comprises: j) creating, on a computer system, a directory structure of said replica target file system based on said database; and k) copying file data from said source file system based on said directory structure.

In one embodiment, subsequent to step i), the method further comprises: l) maintaining said changelog operable to store sequentially one or more data records each corresponding to a modification of the source file system by a storage request; m) at a third time later than said second time, specifying a third data record; n) updating, on a computer system, said database with sequential data records from said second data record to said third data record of said changelog; and o) building, on a computer system, a replica target file system based on said updated database.

In one embodiment, step d) comprises reading, for each directory inode in said scan, the parent object identifier, the parent object version, the filename, the child object identifier and the child object version of each directory entry in said directory inode.

In one embodiment, in step g), said information includes the parent object identifier, the parent object version, the filename, the child object identifier and the child object version of each directory or file inode.

In one embodiment, step h) comprises: p) for each data record, comparing the parent object identifier, the parent object version, the filename, the child object identifier and the child object version of each directory or file inode and the version number of said child object identifier.

In one embodiment, step p) further comprises retaining the information relating to the directory or file inode having the highest version number.

In one embodiment, said changelog is immutable.

According to a second aspect of the present invention, there is provided a controller operable to replicate a source file system on a storage system comprising at least one data storage resource, the or each data storage resource comprising a source file system operable to process storage requests to said data storage resource from one or more client computers, the source file system comprising a plurality of files and directories, each file being associated with a file inode and each directory being associated with a directory inode, the controller being operable to utilise a changelog operable to store sequentially one or more data records each corresponding to a modification of the source file system by a storage request; specify a first data record of said changelog at a first time; initiate a scan of the directory inodes of said source file system at said first time; scan said directory inodes; complete said scan at a second time later than said first time; specify a second data record of said changelog at said second time; store, in a database, information corresponding to said scanned directory inodes; update said database with sequential data records from said first data record to said second data record of said changelog; and build a replica target file system based on said database.

In one embodiment, the controller is operable to build a replica target file system by: creating, on a computer system, a directory structure of said replica target file system based on said database; and copying file data from said source file system based on said directory structure.

In one embodiment, the controller is further operable to maintain said changelog operable to store sequentially one or more data records each corresponding to a modification of the source file system by a storage request; to specify, at a third time later than said second time, a third data record; to update, on a computer system, said database with sequential data records from said second data record to said third data record of said changelog; and to build, on a computer system, a replica target file system based on said updated database.

In one embodiment, the controller is further operable to perform said scan by reading, for each directory inode in said scan, the parent object identifier, the parent object version, the filename, the child object identifier and the child object version of each directory entry in said directory inode.

In one embodiment, said information includes the parent object identifier, the parent object version, the filename, the child object identifier and the child object version of each directory or file inode.

In one embodiment, the controller is operable to carry out said updating by, for each data record, comparing the parent object identifier, the parent object version, the filename, the child object identifier and the child object version of each directory or file inode and the version number of said child object identifier.

In one embodiment, said comparing comprises retaining the information relating to the directory inode or file inode having the highest version number.

In one embodiment, said changelog is immutable.

According to a third aspect of the invention, there is storage system comprising at least one data storage resource and the controller of the third or fourth aspects.

According to a fourth aspect of the present invention, there is provided a computer program product executable by a programmable processing apparatus, comprising one or more software portions for performing the steps of the first and/or second aspects.

According to a fifth aspect of the present invention, there is provided a computer usable storage medium having a computer program product according to the sixth aspect stored thereon.

According to a sixth aspect of the present invention, there is provided a non-transitory computer usable storage medium having a computer program product executable by a programmable processing apparatus, comprising one or more software portions for performing the steps of the first aspect.

Embodiments of the present invention will now be described in detail with reference to the accompanying drawings, in which:

FIG. 5 is a schematic diagram showing the general components of a back up system.

Embodiments of the present invention provide a method of enabling a coherent replica of a source file system to be created on a target file system whilst the source file system is in use, i.e. whilst modifications to the source file system are taking place.

Figure 1:
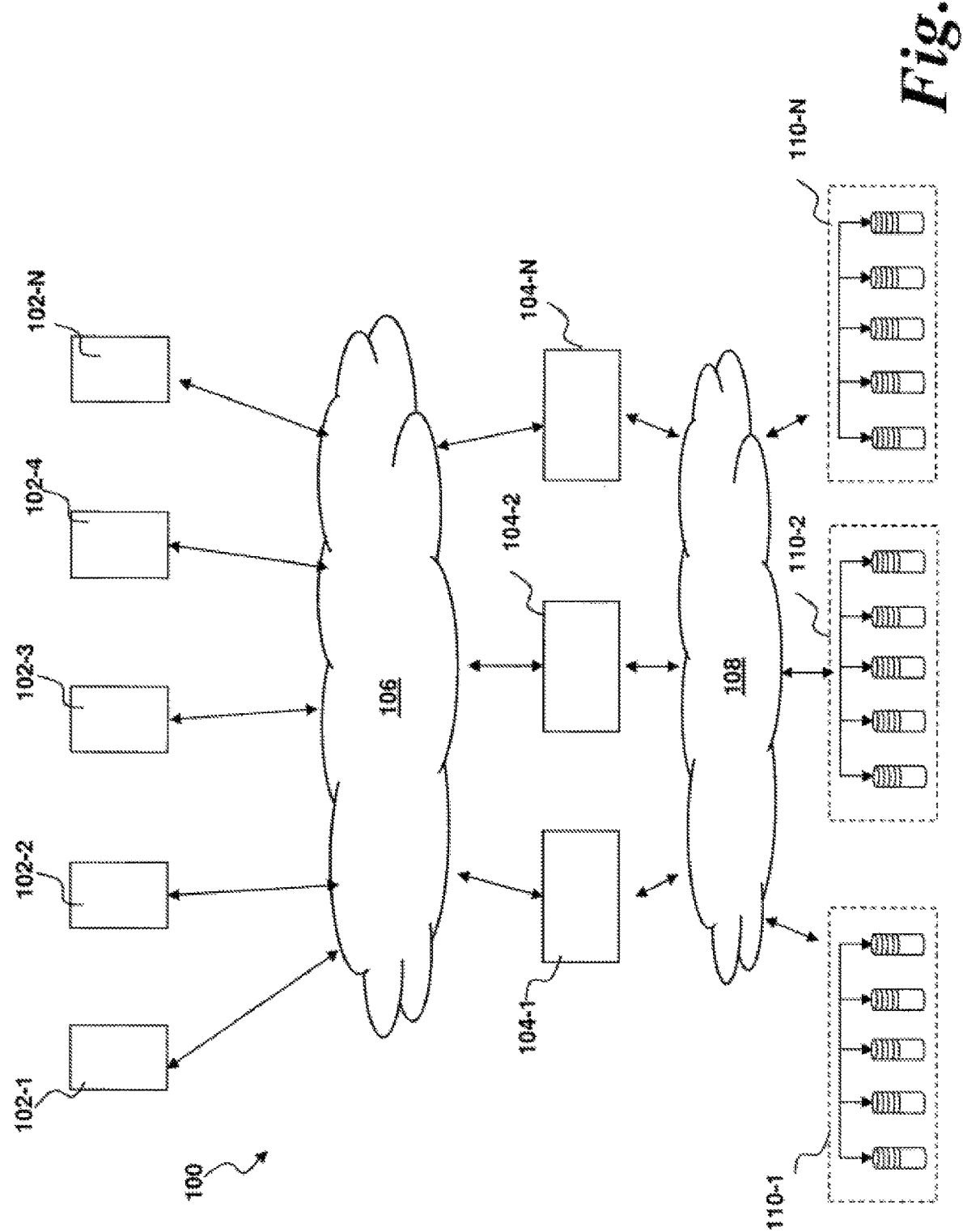
FIG. 1 is a schematic diagram of a networked storage system according to an embodiment of the present invention.

FIG. 1 shows a schematic illustration of a networked storage resource 100 in which the present invention may be used. However, it is to be appreciated that a networked storage resource is only one possible implementation of a storage resource that may be used with the present invention. Indeed, the storage resource need not necessarily be networked and may comprise, for example, systems with local or integrated storage resources such as a personal computer, laptop, so-called "smartphone" or personal data assistant (PDA).

The networked storage resource 100 comprises a cluster file system. A cluster file system consists of client 102-1 to 102-N and server 104-1 to 104-N nodes, connected by a network 106. Client applications, running on client nodes, make storage requests (which may comprise file storage requests) against the cluster file system. Some of these calls result in updates to the file system state, recorded in volatile and persistent stores of node.

The networked storage resource comprises a plurality of hosts 102. The hosts 102 are representative of any computer systems or terminals that are operable to communicate over a network. Any number of hosts 102 or servers 104 may be provided; N hosts 102 and N servers 104 are shown in FIG. 1, where N is an integer value.

The hosts 102 are connected to a first communication network 106, which couples the hosts 102 to a plurality of servers 104. The communication network 106 may take any suitable form, and may comprise any form of electronic network that uses a communication protocol; for example, a local network such as a LAN or Ethernet, or any other suitable network such as a mobile network or the internet.

The servers 104 are connected through device ports (not shown) to a second communication network 108, which is also connected to a plurality of storage devices 110-1 to 110-N. The second communication network 108 may comprise any suitable type of storage controller network which is able to connect the servers 104 to the storage devices 20. The second communication network 108 may take the form of, for example, a SCSI network, an iSCSI network or fibre channel. However, it is to be understood that the network 108 is optional and the servers 104 may each have locally-connected storage.

The servers 104 may comprise any storage controller devices that process commands from the hosts 102 and, based on those commands, control the storage devices 110. The storage devices 110 may take any suitable form; for example, tape drives, disk drives, non-volatile memory, or solid state devices.

Although most storage architectures use hard disk drives as the main storage devices, it will be clear to the person skilled in the art that the embodiments described herein apply to any type of suitable storage device. More than one drive may form a storage device 110; for example, a RAID array of drives may form a single storage device 110. The skilled person will be readily aware that the above features of the present embodiment could be implemented in a variety of suitable configurations and arrangements. Additionally, each storage device 110 comprising a RAID array of devices appears to the hosts 102 as a single logical storage unit (LSU) or drive. Any number of storage devices 110 may be provided; in FIG. 1, N storage devices 110 are shown, where N is any integer value.

The operation of the servers 104 may be set at the Application Programming Interface (API) level. Typically, Original Equipment Manufactures (OEMs) provide RAID networks to end clients for network storage. OEMs generally customise a RAID network and tune the network performance through an API.

The servers 104 and storage devices 110 also provide data redundancy. The storage devices 110 comprise RAID controllers which provide data integrity through a built-in redundancy which includes data mirroring. The storage devices 110 are arranged such that, should one of the drives in a group forming a RAID array fail or become corrupted, the missing data can be recreated from the data on the other drives.

Figure 2:
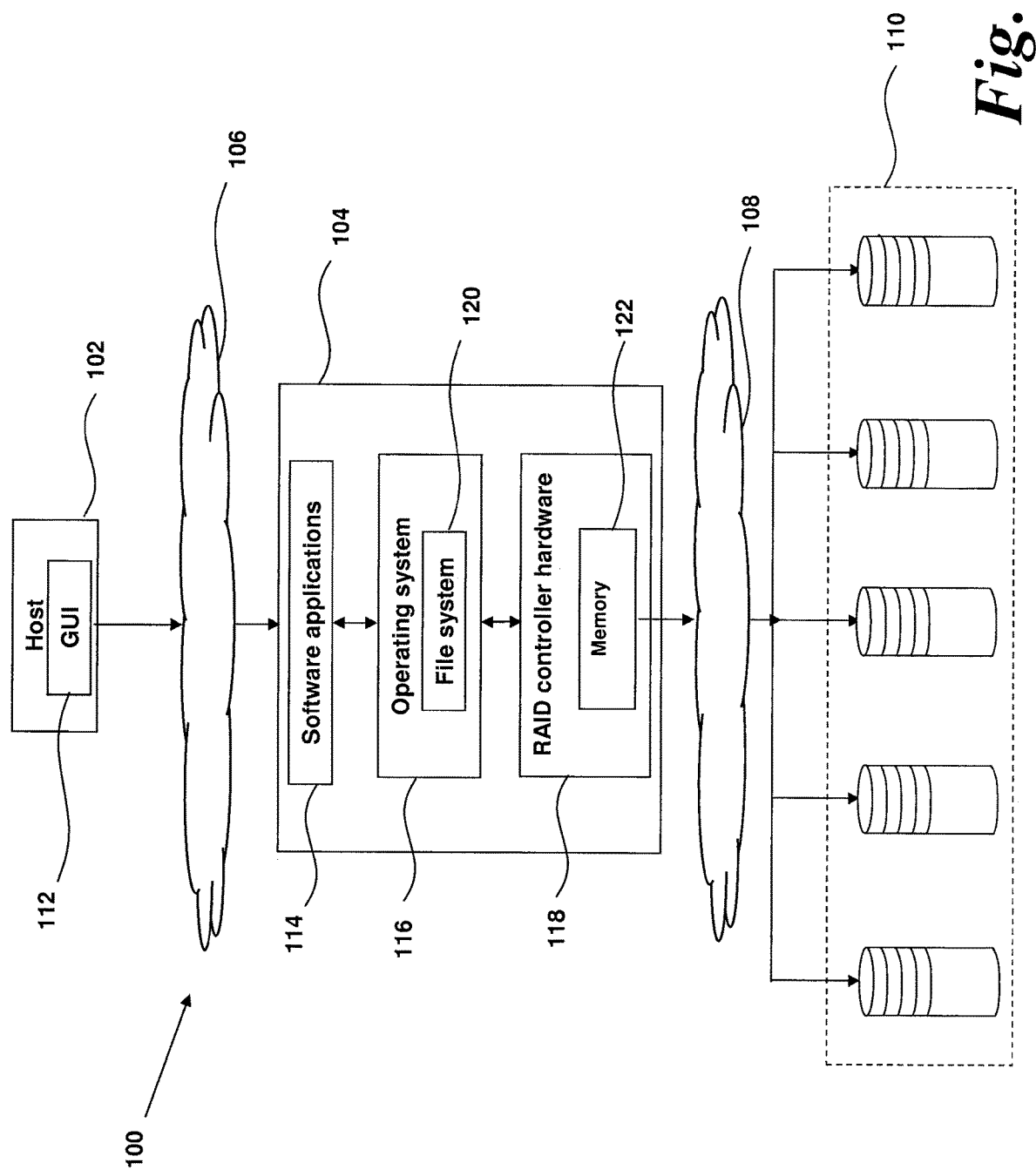
FIG. 2 is a more detailed schematic diagram showing a single server and storage device of an embodiment.

FIG. 2 shows a more detailed schematic diagram of a single host 102 and single server 104 which may form the whole or part of the storage resource 100.

The host 102 comprises a general purpose computer (PC) which is operated by a client and which has access to the storage resource 100. A graphical user interface (GUI) 112 is run on the host 102. The GUI 112 is a software application which acts as a user interface for a client of the host 102.

The server 104 comprises a software application layer 114, an operating system 116 and RAID controller hardware 118. The software application layer 114 comprises software applications including the algorithms and logic necessary for the initialisation and run-time operation of the server 104.

The software application layer 114 includes software functional blocks such as a system manager for fault management, task scheduling and power management. The software application layer 114 also receives commands from the host 102 (e.g., assigning new volumes, read/write commands) and executes those commands. Commands that cannot be processed (because of lack of space available, for example) are returned as error messages to the client of the host 102.

The operating system 116 utilises an industry-standard software platform such as, for example, Linux, upon which the software applications forming part of the software application layer 114 can run. The operating system 116 comprises a file system 120 which enables the RAID controller 104 to store and transfer files and interprets the data stored on the primary and secondary drives into, for example, files and directories for use by the operating system 120.

The RAID controller hardware 118 is the physical processor platform of the RAID controller 104 that executes the software applications in the software application layer 116. The RAID controller hardware 118 comprises a microprocessor, memory 122, and all other electronic devices necessary for RAID control of the storage devices 110. However, the controller hardware need not be in the form of RAID hardware and other storage architectures may be utilised and controlled by the controller and fall within the scope of the present invention.

Whilst, in FIG. 2, the RAID controller hardware 118 is shown as part of the server 104, this need not be so. The skilled person would be readily aware of alternatives which fall within the scope of the present invention; for example, the RAID controller hardware 118 may be remote from the server 104. In addition, the RAID controller hardware 118 may be located together with the storage devices 110 or remotely therefrom.

The server 104, as described above, is specified as a general component of a networked storage resource 100 and may comprise any suitable networked computer system capable of receiving and issuing storage requests (such as I/O requests) and data transfers. However, the server 104 may also be utilised with a computing device having local storage, such as a personal computer or laptop with an internal hard drive or flash memory.

The server 104 is operable to receive storage requests (which may comprise I/O requests) to a file system 120 from hosts or clients 102 and process said storage requests to the file system 120. The file system 120 may comprise any suitable system and may be run on the server 104 to provide access to the storage devices 110. Non-exhaustive examples of suitable file systems may be: NTFS, HFS, ext3, ext4 or idiskfs.

Figure 3:
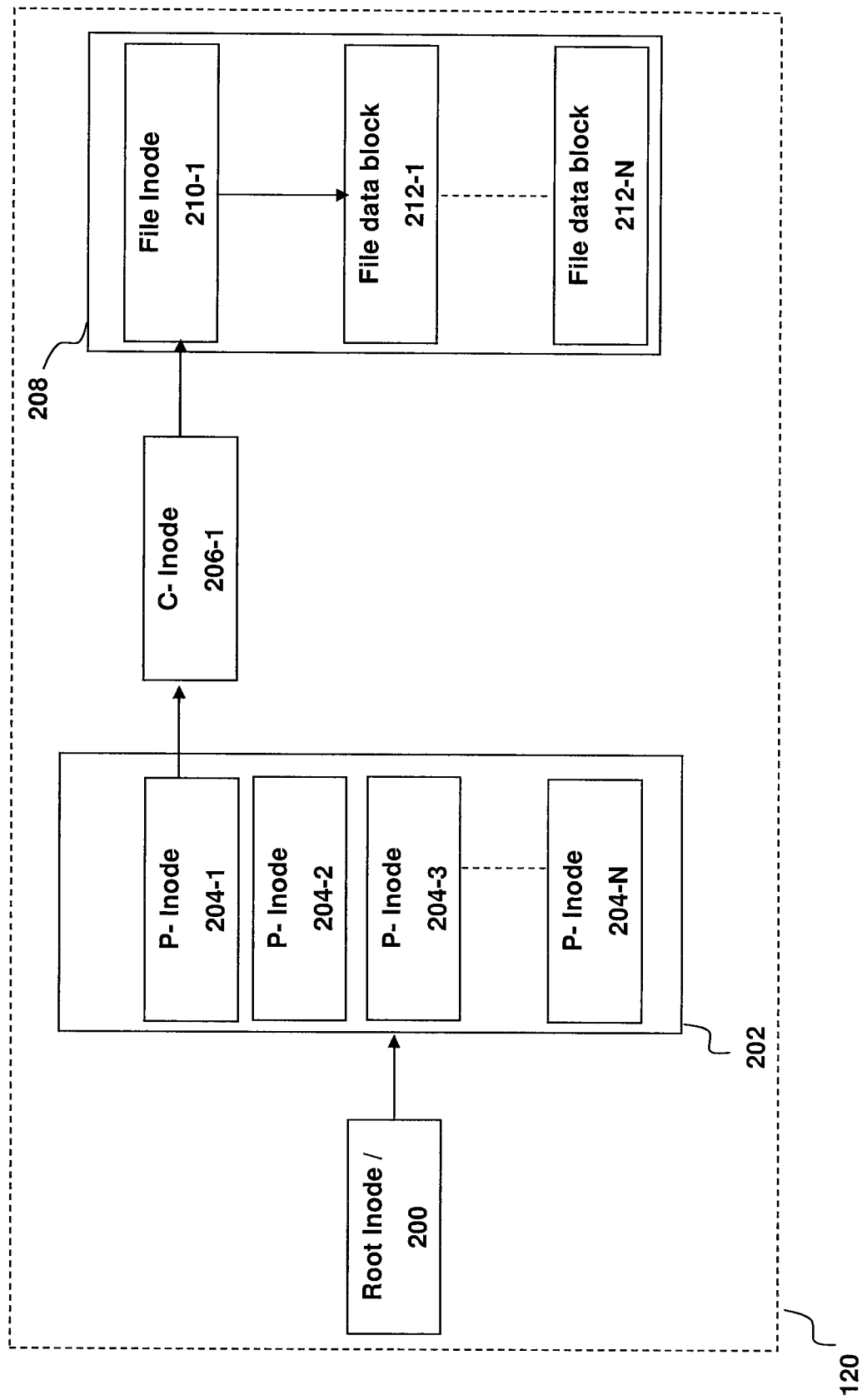
FIG. 3 is a schematic diagram showing the general components of the file system structure.

FIG. 3 shows the structure of the file system 120 in more detail. In a file system such as UNIX system, the files are organised in a hierarchical format comprising a tree of directories with files being located at the "leaves" of the tree. The highest level directory is called the root directory (denoted by /). Immediately below the root level directory are other directories. Below this can exist system files, application files, other directories and/or user data files.

In addition to the actual file data, the file system 120 comprises data structures, or metadata relating to the directories and files. In UNIX systems, this metadata comprises an inode (or "index node"). Inodes store metadata relating to files and directories, such as file ownership, access mode (read, write, execute permissions), file type, access times, size on the disk and the sequence of disk blocks assigned to the respective file or directory.

Within a UNIX file system, both directories and files are implemented similarly: an inode is implemented for each file and for each directory that stores some key attributes, For a file, blocks contain file data, written by users. For a directory, these blocks contain a collection of "directory entries". Each inode is assigned an integer inode number. The inode number indexes an inode table in a known location on the device; from the inode number, the file system drivers can access the contents of the inode, including the location of the file allowing access to the file. Each inode entry is, conceptually, a pair comprising:

[name,inode number]     1)

where name is a name of a sub-directory or of a file located in the directory and inode number is, as described above, unique identifier of the inode. This structure allows the file system code to traverse the directory tree, starting from the root directory and descending along a path of names.

Whilst the term inode is used in the following description to refer to metadata relating to directories and files within a file system, this term is to be taken as non-limiting and the features referred thereto may be considered to be any suitable type of metadata package or container comprising metadata relating to directory or file attributes.

A schematic of the general structure of the file system 120 is shown in FIG. 3. The file system 120 comprises a root inode 200 which points to an inode file 202. The inode file 202 describes the namespace of the file system 120 and comprises a list of all directories and files for a given volume at a particular time on the file system 120. The file system 120 comprises a plurality of inode entries 204-1 to 204-N. As described above, inode entries may take the form of directory, or parent inodes (P-inodes) 204-1 to 204-N which list the files or further directories contained within. If a P-inode 204-1 to 204-N refers to a directory comprising further directories or files, the P-inode 204-1 to 204-N will point to a child inode (or C-Inode) 206-1.

The C-Inode 206-1 may comprise a further directory entry for a directory which comprises files or further directories. The C-inode 206-1 will, in that case, act as a parent inode for the directories or files therein, which will be child directories of the C-inode 206-1.

File inodes 210 are also present in the inode file 202 to represent data files 208. As schematically represented in FIG. 3, the file inode 210-1 represents metadata pointing to file data blocks 212-1 to 212-N.

Each of the inodes 204, 206, 210 described above comprise metadata relating to the file structure and files contained therein. An inode can, as described above, have multiple parents. Whenever an actual data block (e.g. file or directory) is modified (e.g., changed, added, deleted, or renamed), at least some of the metadata in the relevant inode will also be modified.

The UNIX file structure can be utilised in an embodiment of the present invention to provide a back up or replication process. As described above, once a file system is in use, it is not possible to provide a coherent snapshot of the namespace because during the time taken to do a full scan of the system, the system will have been modified by accesses thereto. Therefore, even in conjunction with changelog (which records a set of records describing the on-going changes in the file system) a coherent replica cannot be created. However, the approach of the present invention enables a changelog to be utilized on an already fully populated file system sufficient for building coherent replicas.

Since the scan cannot capture a coherent namespace (e.g. a not-yet-scanned directory and its contents may be moved into an already-scanned directory), a different type of scan is required. A method according to an embodiment of the invention will now be described with reference to FIGS. 4 and 5.

Figure 4:
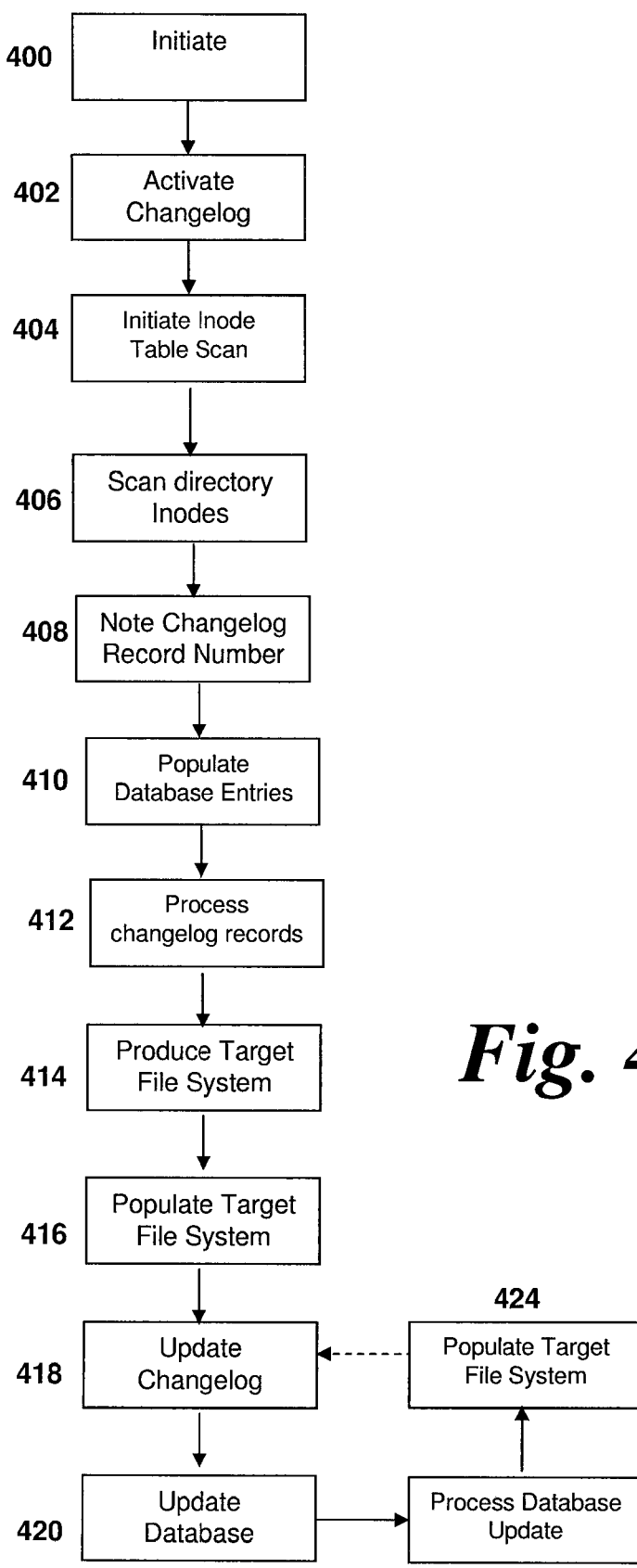
FIG. 4 is a flowchart showing an embodiment of a method of operation of the present invention.

FIG. 4 shows a flow chart illustrating the steps of the method according to an embodiment of the present invention. FIG. 5 shows a general schematic of the components of the server 104 relevant to the description below.

Step 400: Initiate

At step 400, the replication process is initiated. This may be enabled either automatically or manually, for example by a system administrator, in the event of a replication of the file system being required. The method proceeds to step 402.

Step 402: Activate Changelog

A changelog 214 is provided on the server 104. The changelog 214 comprises a record of updates to the file system state since the activation time. The first changelog record since the activation of the changelog is denoted T0.

The file system 120 is updated whenever a storage request (e.g. a write request) makes a modification to the state of the file system 120; for example, when new data is written to a storage resource, or when a file is moved, modified or renamed. Whenever such a request is received, the changelog 214 is updated to include information relating to the update.

In this embodiment, the changelog 214 is stored on the server 104. However, this need not be so and the changelog 214 may be located elsewhere.

The information relating to the update may comprise any suitable form of data or metadata representative of the change to the file state. The changelog 214 takes the form of an ordered stream of data listing the updates to the file system 120 since the first changelog record T0.

The changelog 214 is immutable. By this is meant that the records within the changelog 214 cannot be modified once they have been created, even though the changelog 214 itself is being updated as each new record is added. The changelog 214 may comprise a look up table (LUT) in which the metadata records of the updates are stored.

When a client application running on a client 102 makes a call or storage request R to the file system 120 (e.g., the creation of a new directory or a write to a file) that updates the file system state, one or more records 216 are added to the changelog 214. A record 216 describes updates to the system tables incurred by the operation. The record 216 is stored persistently on the server 104 as part of the same transaction in which the operation is executed.

In other words, each record 216 describes the operation itself (e.g. write or modification to a file or directory) together with the details of its execution (e.g. the identifier of a newly created directory, or the physical addresses of blocks modified by the write or file creation). In other words, the changelog 214 comprises a record 216 or entry for each modification of the file system state performed directly or indirectly as a result of file system client requests.

The changelog 214 is continuously updated when the file system 120 is in use. Therefore, the changelog 214 maintains a current record of the updates occurring on the file system 120 whilst the file system 120 is in operation. Collectively, the changelog 214 records the full history of the file system 120 since time T0.

The method then proceeds to step 404.

Step 404: Initiate Inode Table Scan

At the same time as the changelog is activated, an inode table scan is initiated. The inode table scan is operable to find all directories and directory entries (filenames) which are not modified during the scan. In order to store the results of the scan, a database 218 is created. The database 218 may be stored on the server 104 or elsewhere. The database 218 will be populated with the results of the scan.

In step 404, the file system Mode tables 202 are read and all directory Modes 202, 206 are found. File Modes 210 are ignored at this stage.

When a directory inode is found, the method proceeds to step 406.

Step 406: Scan Directory Inodes

When a directory inode (i.e. a P-inode 202) is found, the directory is read and each directory entry (i.e. the file tree, file associations etc.) in the directory is logged. We record the parent identifier (i.e. the directory we are reading), the filename (from the directory entry), and the child object (file) identifier (including version). The inode scan then continues.

This guarantees that all unmodified directories are included in the scan (it is acceptable to miss new or deleted directories), and that no unmodified directory entries (filenames) are missed. Modified, new, or deleted directories and files will be noted in the changelog 214 and resolved in a later step as will be described.

Step 408: Note Changelog Record Number

At step 408, the time at which the scan in step 406 has completed is noted and the current changelog 214 record number is noted. This is changelog record T1 and this represents the earliest point at which a coherent replica of the file system 120 can be formed. The changelog 214 continues to record changes to the file system 120.

The method proceeds to step 410.

Step 410: Populate Database Entries

Once the scan has completed in step 406, the database 218 can be populated with the namespace entries obtained in step 406. The algorithm for operation of this step functions as follows:

A "Fid" comprises an inode number which is unique throughout the whole file system history. For a file system such as Lustre, a Fid is defined as a pair as set out in expression 2):

$$\text{Fid}=(\text{inode,generation}) \qquad 2)$$

The method of the present invention models the file system state at a given moment in time as a set of directory entries (De), where each directory entry is comprises the following elements as set out in expression 3):

$$\text{De}=(\text{pobj,name,cobj}), \qquad 3)$$

where a parent (pobj) and child (cobj) "objects" have the same structure:

$$\text{obj}=(\text{fid,ver,attrs}) \qquad 4)$$

where ver is an object version (increasing monotonically and possibly with gaps throughput the object history) and attrs are the rest of the object attributes. The database 218 comprises a set of directory entries (De). The database 218 at the time t is denoted DB(t).

Next, a fid triple (Ftrip) is defined as:

$$\text{Ftrip}=[\text{pfid,name,cfid}] \qquad 5)$$

A directory entry De and a fid triple ftrip "match" is denoted as:

$$\text{match(De,Ftrip)} \qquad 6)$$

And this condition is considered satisfied when:

de.pobj.fid=ftrip.pfid & de.cobj.fid=ftrip.cfid &

$$\text{de.name=ftrip.name} \qquad 7)$$

The database 218 is considered to be "well-formed" when for any fid triple Ftrip it contains no more than a single matching directory entry. Given a set S of entries, S[ftrip] denotes a sub-set of all entries matching ftrip.

This model of a file system state reduces a file system to its name-space structure and disposes of a separate description of files (which would typically be represented as an inode table, object index or a similar kind of data). Information about files can be recovered from the name-space by defining, for each fid:

$$\text{file(DB,fid)} \qquad 8)$$

an object obj=(fid, ver, attrs) such that $$\text{obj.fid=fid} \qquad 9)$$

Where obj belongs to some directory entry from database 218 (DB) either as a parent or a child object and obj.ver is maximal among all objects enjoying previous two properties.

Once the database is populated with the results of the scan in step 406, the method proceeds to step 412.

Step 412: Process Changelog Records T0 to T1

The changelog 214 has recorded changes to the file system 120 which have taken place whilst the scan was ongoing in step 406. These are the changelog records from T0 to T1, with T0 marking the first changelog record when the scan was started, and T1 marking the record at the point at which the scan in step 406 was complete.

The database 218 is then updated to include the changes made to the file system 120 since the scan was started, i.e. the changelog records from T0 to T1 are incorporated into the database 218.

This is done by processing, in order, each of the changelog records from T0 to T1. For each record, the fid inode number and generation of the files involved is noted, and the namespace effect on each file or inode.

The namespace effect on each file or inode can be decomposed into sets of one of two operations: the addition of a record triple (ADD) or the removal of a record triple (DEL). For example, a simple namespace operation such as "chmod" might remove the triple {parent, name, [child obj id, ver 1]}, and add the triple {parent, name, [child obj id, ver 2]}.

For each of these operations, a matching triple is checked for in the database; if one exists, the generation number is noted. The triple having the greater generation number is then retained or added. If the operation is DEL, the record can be removed from the database.

On an algorithmic basis, this comprises the following elements. A file system "history" H is defined by the changelog records as an infinite sequence of records of the form:

$$(\text{seq,OP(pobj,name,cobj)}), \qquad 10)$$

where seq \in $\{1, \ldots\}$ and OP (or operation) comprises either "ADD" or "DEL" operation and seq comprises a time-stamp ordering all file system operations in the history in a serial manner.

A sub-sequence of records with X<seq<=Y is denoted H(X, Y). H(0, t) is denoted H(t) and comprises the entire history from the initiation of the changelog in step 402 up to and including time t.

A record (t+1, ADD(pobj, name, cobj)) can by "applied" to DB(t) by adding a (pobj, name, cobj) entry to DB(t) on a pre-condition that DB(t) contains no entry matching [pobj.fid, name, cobj.fid].

Similarly, a record (t+1, DEL(pobj, name, cobj)) can be applied to a data-base which contains exactly one entry matching [pobj.fid, name, cobj.fid], by removing this entry. Therefore, the application of the history record process preserves the well-formed nature of the database 218. By repeating the record 216 application procedure a function is obtained:

$$DB(Y)=DB(X).apply(H(X,Y)) \quad\quad 11)$$

and, specifically:

$$DB(t)=DB(0).apply(H(t)), \quad\quad 12)$$

where DB(0) is assumed to be the empty set (that is, mkfs starts adding entries to H with seq=1, 2, . . . ). Note, that history roll-back can be defined similarly.

History record entries defined in this manner do not correspond one-to-one to the entries of, for example, a Lustre changelog or Colibri file operations log(FOL). For example, a rename operation "mv a/b c/d" adds two entries to the history:

$$(seq,DEL((a.fid,a.ver,a.attrs),"b",(b.fid,b.ver,b.attrs))) \quad\quad 13)$$

$$(seq+1,ADD((c.fid,c.ver,c.attrs),"d",(b.fid,b.ver',b.attrs))) \quad\quad 14)$$

and chmod ("x", 0777) operation also produces two records:

$$(seq,DEL(A,name,x)) \quad\quad 15)$$

$$(seq+1,ADD(A,name,(x.fad,x.ver',x.attr)) \quad\quad 16)$$

where "A/name" is any name for x. Next, the following can be defined:

$$add(fid)=\min(seq\ s.t.(seq,ADD(*,*,cobj))\backslash in\ H \quad\quad 17)$$

where cobj.fid==fid. That is, add(fid) is a time when a file with a given fad was created or ~0 (assumed to be later than any other time) if fid is not used in the whole infinite file system history. Similarly, del(fid) is a time when file was finally deleted, or 0 if it is never deleted. Therefore, a time interval can be defined:

$$lifespan(fid)=[(add(fid),del(fid)] \quad\quad 18)$$

which is a time interval while the file existed. lifespan(fid) is empty if the fid is never used. So:

$$exists(fid,t)=(t\backslash in\ lifespan(fid)) \quad\quad 19)$$

Which is true if the file exists at the time t, and:

$$stable(fid,t0,t1)=[t0,t1]\ is\ a\ sub\text{-}interval\ of\ lifespan(fid) \quad\quad 20)$$

is true if the file existed at t0 and was deleted no earlier than t1 if at all. Therefore, as explained above, H(T0, T1) captures the notion of the changelog 214 from record T0 to record T1. Next, consider the results from the scan in step 406 to produce a scan log which is a set (not a sequence) of "observations" of the form:

$$HAS(pobj,name,cobj) \quad\quad 21)$$

where the observation is atomic with respect to the file system modifications recorded in H and each observation was taken at some moment in [T0, T1]. The desired outcome of the scan and then updating process to include the changelog records is to establish:

$$DB(T1)=combine(H(T0,T1),scan\ log), \quad\quad 22)$$

where "combine" is some function of logs and:

$$DB(T1)=DB(T0).apply(H(T0,T1)) \quad\quad 23)$$

In order to function, some conditions must be imposed on the scan log. At the very least each element of DB(T1) has to be present in at least one of the logs because, otherwise, the function combine( ) has no way to divine DB(T1) from the logs.

The atomicity of the scan log relative to H (and assumed serialisability of H) means that for any two different records OP0(pobj0, name0, cobj0) and OP1(pobj1, name1, cobj1) (from the same or different log), matching the same fid triple, either $$pobj0.ver<pobj1.ver\ \&\&\ cobj0.ver<cobj1.ver \quad\quad 24)$$

$$pobj0.ver>pobj1.ver\ \&\&\ cobj0.ver>cobj1.ver \quad\quad 25)$$

In other words, the records can be consistently ordered by the object versions.

One possible combine( ) function can be defined in the following sequence:

$$combine(changelog,scan\ log) \quad\quad 26)$$

which forms a well-formed database. The proof of this is as follows: suppose an entry (pobj, name, cobj) belongs to DB(T1). This means that the last matching record in the H(T1) is ADD(pobj,name,cobj). If this matching entry does not belong to H(T0, T1) then, by completeness condition, the scan log has a matching observation entry. In any case, the corresponding max(h) in combine( ) execution will be either ADD(pobj, name, cobj) or HAS(pobj, name, cobj), and (pobj, name, cobj) is in combine( ) result. Therefore, DB(T1) is a sub-set of combine(H(T0, T1), scan log).

Once the database 218 is updated with records that are consistent and coherent up to record T1, then the method proceeds to step 414.

Step 414: Produce Target File System

Once the database 218 is complete, the database 218 can then be scanned and every record found can be used to produce an equivalent state on a target replica file system 220.

Initially, the database 218 can be utilised to create a directory tree on the target (replica) file system. If there are dependencies for a given record, for instance the parent directory does not yet exist, the depended-upon information will exist in the database, and therefore can be replicated to the replica file system first. In this manner, the entire state of the original file system as of T1 can be replicated to the replica file system.

Step 416: Populate Target File System

Once the directories and inodes are created on the target file system 220 from the database 218, file data can then be obtained from the source file system 120 and used to populate the target file system 220 to produce a replica of the file system 120 at record T1.

Step 418: Update Changelog

Once the target file system 220 is updated as set out in steps 414 and 416 above, the target file system 220 comprises a replica of the file system 120 at the time record T1 was logged.

However, the file system 120 will be in constant use and will be modified by accesses. These accesses will generate additional records 216 in the changelog 214. The new data records will comprise metadata relating to the modification made to the file system state and may comprise the location of blocks modified by, for example, a storage request or other data relating to the change which has occurred.

The addition of a changelog record 216 to the changelog 214 is done at substantially the same time as the modification to the file system state, so that the changelog 214 comprises an accurate record of the modifications to the file system state.

Since the updating of the changelog 214 by adding a new data record is not resource-intensive, this can be done substantially simultaneously with the previous step without impacting on the client side system latency. This process continues for all updates to the file system state.

Step 420: Update Database

At step 420, if it is desired to update the target file system 220 to a coherent replica of the current file system state, then a current changelog record 216 can be assigned reference T2 and the target file system 220 updated to be coherent up to that record entry.

In order to do this, the database 218 is updated to include the changes made to the file system 120 from record T1 to record T2 and these changes are incorporated into the database 218.

This is done by processing, in order, each of the changelog records from T1 to T2. For each record, the fid inode number and generation of the files involved is noted, and the namespace effect on each file or inode.

The namespace effect on each file or inode can be decomposed into sets of one of two operations: the addition of a record triple (ADD) or the removal of a record triple (DEL). For example, a simple namespace operation such as "chmod" might remove the triple {parent, name, [child obj id, ver 1]}, and add the triple {parent, name, [child obj id, ver 2]}.

For each of these operations, a matching triple is checked for in the database; if one exists, the generation number is noted. The triple having the greater generation number is then retained or added. If the operation is DEL, the record can be removed from the database.

Once the database 218 is updated with records that are consistent and coherent up to record T2, then the method proceeds to step 422.

Step 422: Process Database Updates

Once the database 218 is updated, the database 218 can then be scanned and every updated record found can be used to produce an equivalent state on a target replica file system 220. In this manner, the entire state of the original file system as of T2 can be replicated to the replica file system.

Step 424: Populate Target File System

Once the directories and inodes are created on the target file system 220 from the database 218, file data can then be obtained from the source file system 120 and used to populate the target file system 220 to produce a replica of the file system 120 at record T2.

Steps 418 to 424 are then continuously repeated, or repeated at predefined intervals as required.

Variations of the above embodiments will be apparent to the skilled person. The precise configuration of hardware and software components may differ and still fall within the scope of the present invention.

For example, the present invention has been described with reference to controllers in hardware. However, the controllers and/or the invention may be implemented partly in hardware and partly in software.

Further, the target file system 220 may be located on the server or servers 104 on which the file system 120 operates. Alternatively, the target file system 220 may be located on a separate server, metadata server or storage device. In the latter case, the replicated data structures are protected from failure of the source server 104 as may be required of a backup configuration providing the necessary redundancy.

An alternative to the exemplary embodiment illustrated is the use of a metadata server which handles directory structures of a file system. The metadata server maintains a table, recording identifies and names of files in directories.

Additionally, whilst the present embodiment relates to arrangements operating predominantly in off-host firmware or software, an on-host arrangement could be used.

The controller or method of the present embodiments may be used to manage a plurality of separate file systems (potentially located on different servers) if required.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method comprising:
   activating a changelog that stores metadata relating to modifications made to a source file system between a first time and a second time;
   recording a first record of the changelog corresponding to the first time, the changelog storing metadata relating to modifications made to the source file system between the first time and the second time;
   performing an initial replication of the source file system, the initial replication comprising:
      initiating a scan of all directory inodes of the source file system at the first time and completing the scan at the second time, wherein directory entry objects corresponding to the scanned directory inodes are formed based on the scan, and the source file system being modified between the first time and the second time, at least one of the modifications not being captured by the scan; and
      adding the directory entry objects to a database, the database comprising no duplicate directory entry objects and reducing the scan of the entire source file system to a name-space structure of a hierarchy of the source file system;
   after the second time, marking a last record of the changelog corresponding to the second time;
   processing the changelog in order from the first record to the last record, the processing comprising:
      decomposing each record of the changelog into one or more history records each comprising an atomic operation corresponding to a file system modification to the directory entry objects of the database, each atomic operation comprising one of an ADD or a DEL operation, at least one of the file system modifications being decomposed into two or more of the atomic operations; and
      combining the history records with the database so that changes to the directory objects are consistently ordered by object version; and
   building a target file system based on the directory entry objects in the database after combining the history records such that the target file system comprises a coherent replica of a directory structure of the source file system at the second time.

2. A method according to claim 1, further comprising:
creating the directory structure of the target file system based on the database; and
copying file data from the source file system to the target file system based on the directory structure, the copying completed at a third time later than the second time.

3. A method according to claim 2, further comprising:
maintaining the changelog to store additional data records corresponding to additional modifications of the source file system between the second time and the third time;
updating the target file system based on the additional data records.

4. A method according to claim 1, wherein each directory object entry comprises a parent object identifier, a parent object version, a filename, a child object identifier and a child object version of the associated directory inode, wherein each of the directory entry objects of the database have a unique combination of the parent object identifier, the filename, and the child object identifier.

5. A method according to claim 4, wherein combining the history records with the database comprises:
for each history record, applying the atomic operation to the directory object in the database that matches the parent object identifier, the filename, and the child object identifier of the history record; and
updating the parent object version number and the child object version of the matching directory object in response to applying the atomic operation.

6. A method according to claim 5, further comprising retaining the directory object having a highest version number.

7. A method according to claim 1, wherein the changelog is immutable.

8. The method of claim 1, wherein the atomic operations comprise only add and delete operations.

9. The method of claim 1, wherein a record of the changelog that changes a file or directory is decomposed into more than one atomic operation.

10. A controller, implemented on a computer system comprising a file system operable to process storage requests, the file system having a hierarchical format comprising a plurality of files and directories, each file being associated with a file inode and each directory being associated with a directory inode, the controller being operable to:
activate a changelog that stores metadata relating to a modification made to the file system between a first time and a second time;
record a first record of the changelog corresponding to the first time;
perform an initial replication of the source file system starting at the first time, the initial replication comprising:
initiate a scan of all of the directory inodes of the file system at the first time and complete the scan at the second time, wherein directory entry objects corresponding to the directory inodes are formed based on the scan, and wherein the source file system is modified between the first time and the second time, at least one of the modifications not being captured by the scan; and
add the directory entry objects to a database, the database comprising no duplicate directory entry objects and reducing the scan of the entire source file system to a name-space structure of a hierarchy of the source file system;
after the second time, mark a last record of the changelog corresponding to the second time;
process the changelog in order from the first record to the last record, the processing involving:
decomposing each record of the changelog into one or more history records each comprising an atomic operation corresponding to a file system modification to the directory entry objects of the database between the first and second time, the atomic operation comprising one of an ADD or DEL operation, the file system modification being decomposed into one or more of the atomic operations; and
combining the history records with the database so that the changes to the directory objects are consistently ordered by object version; and
build a replica file system based on the directory entry objects in the database after combining the history records, the replica file system comprising a coherent replica of a directory structure of the file system at the second time.

11. A controller according to claim 10, wherein the controller is operable to:
create the directory structure of the replica file system based on the database; and
copy file data from the file system based on the directory structure, the copying completed at a third time later than the second time.

12. A controller according to claim 11, further operable to:
maintain the changelog to store additional data records each corresponding to additional modifications of the file system between the second time and the third time; and
update the replica file system based on the additional data records.

13. A controller according to claim 10, wherein each directory object entry comprises a parent object identifier, a parent object version, a filename, a child object identifier and a child object version of the associated directory inode, wherein each of the directory entry objects of the database have a unique combination of the parent object identifier, the filename, and the child object identifier.

14. A controller according to claim 13, wherein combining the history records with the database comprises:
for each history record, applying the atomic operation to the directory object in the database that matches the parent object identifier the filename, and the child object identifier of the history record; and
updating the parent object version number and the child object version of the matching directory object in response to applying the atomic operation.

15. A controller according to claim 14, wherein the controller is operable to the directory object having the highest version number.

16. A controller according to claim 10, wherein the changelog is immutable.

17. A non-transitory computer usable storage medium having a computer program executable by a programmable processing apparatus, comprising one or more software portions for performing the method of claim 1.

18. A method comprising:
perform an initial replication of a source file system having a hierarchical format starting at the first time, the initial replication comprising scanning all directory inodes of a source file system between a first and second time, directory information objects of the inodes being stored in a database to form a non-coherent replica of a directory namespace structure of a hierarchy of the source file system at the second time, the database comprising no duplicate directory information objects, wherein the source file system is modified between the first time and the second time, at least one of the modifications not being captured by the scan;

storing, in a changelog between the first and second times, records each comprising metadata relating to the modifications made to the source file system that are not captured by the scanning;

after the second time, processing the changelog in order from a first record to a last record that respectively correspond to the first time and the second time, the processing comprising:

decomposing each record of the changelog into one or more history records each comprising an atomic operation corresponding to a file system modification to the directory entry objects of the database between the first and second time, each atomic operation comprising one of an ADD or a DEL operation, at least one of the file system modifications being decomposed into two or more of the atomic operations; and combining the history records with the database so that the file system modifications to the directory objects are consistently ordered by object version to form a coherent replica of the directory structure of the source filesystem at the second time; and using the coherent replica of the directory structure to backup or replicate the source filesystem.

19. The method of claim 18, further comprising:

creating the coherent directory structure on a target filesystem; and copying file data from the source file system to the target file system, the copying completed at a third time later than the second time.

20. The method of claim 19, further comprising:

storing, in the changelog, additional metadata relating to additional modifications made to the filesystem between the second time and the third time; and updating the target file system based on the additional metadata.

* * * * *